March 21, 1972 F. G. PETERS ET AL 3,650,921
TECHNIQUE FOR THE PREPARATION OF IRON OXIDE FILMS BY CATHODIC SPUTTERING
Filed June 15, 1970
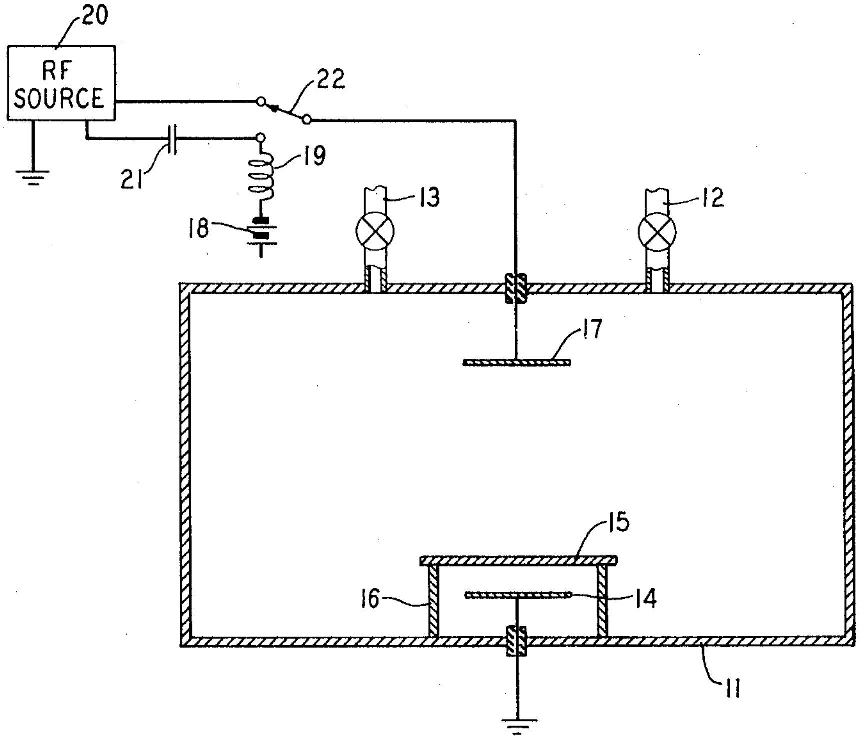
INVENTORS F. G. PETERS
W. R. SINCLAIR
M. V. SULLIVAN
BY Edward M. Fink
ATTORNEY United States Patent Office 3,650,921
Patented Mar. 21, 1972

3,650,921

TECHNIQUE FOR THE PREPARATION OF IRON OXIDE FILMS BY CATHODIC SPUTTERING

Frank Groom Peters, Nutley, and William Robert Sinclair and Miles Vincent Sullivan, Summit, N.J., assignors to Bell Telephone Laboratories, Incorporated, Murray Hill, N.J.

Filed June 15, 1970, Ser. No. 46,405
Int. Cl. C23c *15/00*
U.S. Cl. 204—192 5 Claims

ABSTRACT OF THE DISCLOSURE

A technique for the preparation of iron oxide films destined for use as photomasks for thin film and semiconductor processing involves sputtering iron oxide in a carbon dioxide ambient upon an electrically isolated substrate member.

BACKGROUND OF THE INVENTION

(1) Field of the invention

This invention relates to a technique for the preparation of iron oxide films. More particularly, the present invention relates to a technique for the fabrication of iron oxide films destined for use as photomasks in photoresist and photolithographic processes, such films being obtained by cathodic sputtering techniques.

(2) Description of the prior art

The need for processing localized areas in microcircuit technology has generated a technology directed to the efficacious preparation and utilization of masks to define diffusion, evaporation and related operations. The use of well-known photomask processes for attaining this end has been universally applied in the microcircuit processing industry with varying degrees of success. Typically, such techniques involve the preparation of a suitable photomask defining the pattern of interest and the use of this mask to transfer an image to a photoresist pattern.

Until recently, it had been conventional to form the mask pattern in a photographic emulsion. In numerous applications, the masks so formed are used repetitively and due to the inherent softness of photographic emulsions deteriorate rapidly due to abrasion. Accordingly, workers in the art turned their attention toward the development of masks manifesting greater durability.

This end was attained by the use of hard inorganic opaque materials, typically metal on glass. A popular mask falling within the scope of this class is prepared by evaporating chromium upon a glass substrate and thereafter forming the desired pattern in photoresist on this surface. Thereafter, the pattern is etched into the chromium. These masks have been found to be very durable and manifest a potentially higher resolution capability than photographic emulsion masks, such being attributed both to the thinness of the deposited metal and the lack of grain and thinness in the image defining photoresist. Although satisfactory from many standpoints, such photomasks are opaque and reflect a high percentage of incident radiation including the light normally used during alignment of the photomask with respect to patterns previously imposed on the substrate. Both the opacity and reflectivity contribute to the difficulty of carrying out this alignment, especially on equally reflective metallized substrates. These masks also reflect the light normally used to expose the photoresist after alignment, so creating a problem of fringing with the concomitant loss of resolution at the edges of the pattern due to multiple reflections between the substrate and the photomask.

Recently, these limitations were successfully overcome by reactivity sputtering a hard inorganic compound upon a glass substrate and etching the deposited layer to form the desired pattern. A number of transition metal oxides were found satisfactory for this purpose, that is, transparent to the light used by the operator to align the photomask with the substrate and highly absorbing at the wavelength used to expose the photoresist on the substrate to be processed. Unfortunately, these masks have not proven to be completely acceptable from the standpoint of etching rate, so prompting continued investigation.

SUMMARY OF THE INVENTION

In accordance with the present invention, a technique is described for the fabrication of an improved iron oxide photomask which is not subject to the limitations of the prior art masks. The inventive technique involves depositing iron oxide films either by RF or combined RF-DC cathodic sputtering of iron oxide in a carbon dioxide ambient and etching the resultant deposited film to form a desired pattern.

BRIEF DESCRIPTION OF THE DRAWING

The invention will be more readily understood by reference to the following detailed description taken in conjunction with the accompanying drawing wherein:

The figure is a schematic representation of an apparatus used in the practice of the present invention.

DETAILED DESCRIPTION

With further reference now more particularly to the figure, there is shown a vacuum chamber 11 provided with an outlet 12 for connection to a vacuum pump (not shown), an inlet 13 for the introduction of a sputtering gas which may comprise carbon dioxide alone or a mixture thereof with an inert gas, an anode member 14, a substrate holder 15 supported by pedestal 16 and a cathode member 17. Cathode member 17 may be connected to the negative pole of a direct current high potential supply 18 by means of inductor 19 and to an RF supply 20 by means of capacitor 21 (the inductor and capacitor being of such value as to pass and reject RF and direct current components as needed) or, in the alternative, directly to RF source 20 by means of switch 22. The positive pole of the direct current supply 18 and one end of RF supply 20 are connected to ground.

The present invention may conveniently be described by reference to an illustrative example wherein it is desired to cathodically sputter an iron oxide coating upon a suitable substrate member in an apparatus of the type shown in the figure.

In the operation of the process a suitable substrate which may be ordinary glass or any well-known material which is transparent over the range of 3,000 to 6,000 A. is inserted within chamber 11 upon substrate holder 15, the latter being maintained in an electrically isolated position in order to assure that the deposited film will be soluble in the etchants normally utilized in the photoresist processing sequence. Studies have revealed that the location of the substrate member upon the anode during the operation of the process causes the formation of an insoluble iron oxide film of the type normally associated with the well-known prior art procedures. Additionally, it is necessary that the substrate member be cooled during the sputtering process in order to obtain the desired soluble films. The iron oxide selected for use in the practice of the present invention is obtained from commercial sources.

The vacuum techniques utilized in the practice of the present invention are known (see "Vacuum Deposition of Thin Films," L. Holland, J. Wiley and Sons, Inc., New York, 1956). In accordance with such procedures, the vacuum chamber is first evacuated, flushed with an inert gas as, for example, any of the members of the rare gas family such as helium, argon or neon and the chamber re-evacuated. The extent of the vacuum required is dependent upon consideration of several factors which are well known to those skilled in the art. However, for the purposes of the present invention a practical initial pressure range is from $10^{-5}$ to $10^{-7}$ torr, while suitable sputtering gas pressures, that is, carbon dioxide or mixtures thereof with inert gases range from $1 \times 10^{-3}$ to $1 \times 10^{-1}$ torr. It has been determined that the sputtering gas may comprise from 3–100 percent by volume carbon dioxide. The use of less than 3 percent carbon dioxide fails to result in a film manifesting the desired characteristics. After the requisite pressure is attained, cathode 17 which is composed of either ferrous or ferric oxide is connected to a source of RF potential directly or is connected to the negative pole of a source of direct current having an RF potential impressed thereon and sputtering initiated by making anode 15 positive with respect to the cathode.

The minimum voltage necessary to produce sputtering is dependent upon the specific cathode material employed. For example, a potential of approximately 1500 volts may be employed to produce a layer of iron oxide suitable for the purposes of this invention. However, in certain instances, it may be desirable to sputter at voltages greater than or less than the noted voltage.

With regard to the RF excitation, it has been found that in order to produce the desired effect the frequency employed must be at least 0.1 megacycle and may range up to the plasma frequency which is defined by the following equation:

$$\omega_p = \left(\frac{ne^2}{\epsilon_0 m}\right)^{1/2}$$

wherein $n$=electron density
$e$=electron charge
$\epsilon_0$=dielectric constant of material sputtering, and
$m$=effective electron mass.

The use of frequencies less than 0.1 megacycle fail to significantly enhance the operation of the process since the plasma density is not appreciably increased whereas the plasma frequency, as defined above, constitutes the absolute maximum beyond which the system shuts down. The potential of the RF source may range from 1 volt to 10 kilovolts, the limits being dictated by practical considerations.

The spacing between the anode and cathode is not critical. However, the minimum separation is that required to produce a glow discharge. For the best efficiency during the sputtering process, the substrate should be positioned immediately without the well-known Crooke's dark space.

The balancing of the various factors of voltage, pressure and relative positions of the cathode and anode to obtain a high quality deposit is well known in the sputtering art.

With reference now more particularly to the example under discussion, by employing a proper voltage pressure and spacing of the various elements within the vacuum chamber, a layer of iron oxide is deposited upon the electrically isolated glass substrate material to yield a film suitable for use as a photomask. Thereafter the iron oxide film may be coated with a commercially available photoresist, exposed to a light pattern and developed by conventional commercial techniques. Finally, an etchant is employed for the purpose of obtaining the desired pattern in the film.

An example of the present invention is described in detail below. The example is included merely to aid in the understanding of the invention and variations may be made by one skilled in the art without departing from the spirit and scope of the invention.

EXAMPLE

A cathodic sputtering apparatus similar to that shown in the figure was used to produce the ferric oxide $$(Fe_2O_3)$$

layer. In the apparatus employed, the substrate comprising a 1" x 3" glass microscope slide was situated upon the substrate holder and a ferric oxide cathode obtained from commercial sources was employed. Initially an RF potential manifesting a net power of 250 watts was applied to the system and the vacuum chamber initially evacuated to a pressure of $8 \times 10^{-6}$ torr. Next, the chamber was flushed with carbon dioxide and re-evacuated to a partial pressure of 35 microns of carbon dioxide.

The cathode was comprised of 6" x ¼" ferric oxide disk mounted on a water cooled copper block. Sputtering was conducted for 110 minutes so resulting in a ferric oxide film 3480 A. in thickness, the deposition rate being approximately 31.6 A. per minute. The resultant ferric oxide film was examined and found to be soluble in hydrochloric acid at room temperature and at 50° C., so indicating its suitability for use in the fabrication of photomasks as described above.

We claim:

1. A method for the fabrication of a photomask comprising the steps of depositing a layer of iron oxide upon a substrate member and etching said layer to form a desired pattern, the improvement which comprises depositing said layer by RF sputtering of an iron oxide cathode in a carbon dioxide ambient containing at least 3 percent by volume of carbon dioxide.

2. A technique in accordance with claim 1 wherein the carbon dioxide ambient contains from 3–100 percent by volume carbon dioxide.

3. A technique in accordance with claim 1 wherein said substrate member is electrically isolated.

4. A technique in accordance with claim 1 wherein said cathode member is simultaneously biased with RF excitation and a negative direct current with respect to a reference electrode.

5. Photomask having defined areas of iron oxide produced by RF sputtering of an iron oxide cathode in a carbon dioxide ambient containing at least 3 percent by volume of carbon dioxide.

References Cited

UNITED STATES PATENTS

| | | | |
|---|---|---|---|
| 3,461,054 | 8/1969 | Vratny | 204—192 |
| 3,485,666 | 12/1969 | Sterling et al. | 204—192 |

OTHER REFERENCES

Holland: Vacuum Deposition of Thin Films, 1956, pp. 474–482.

JOHN H. MACK, Primary Examiner

S. S. KANTER, Assistant Examiner